Figure 3:
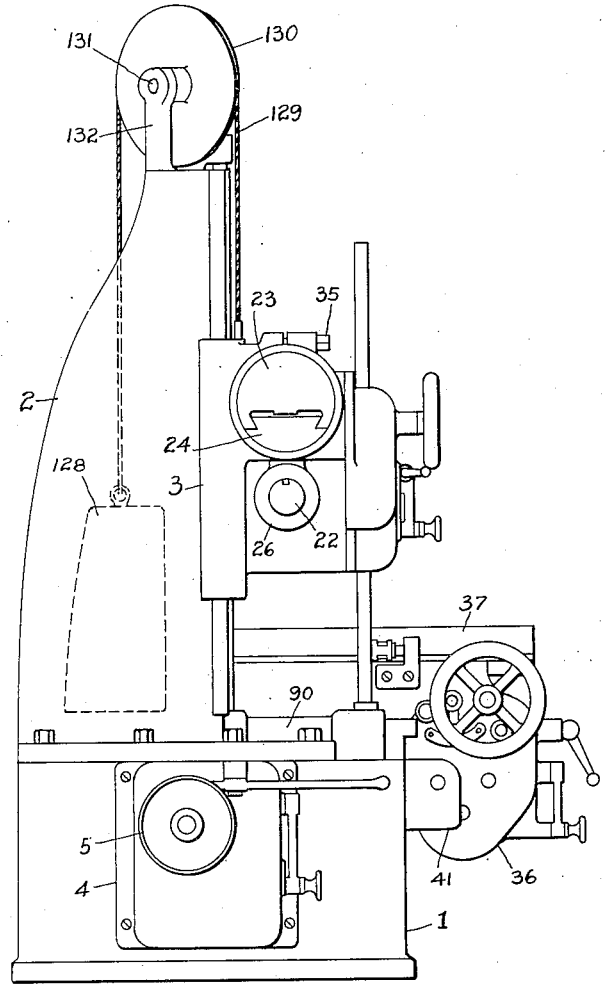

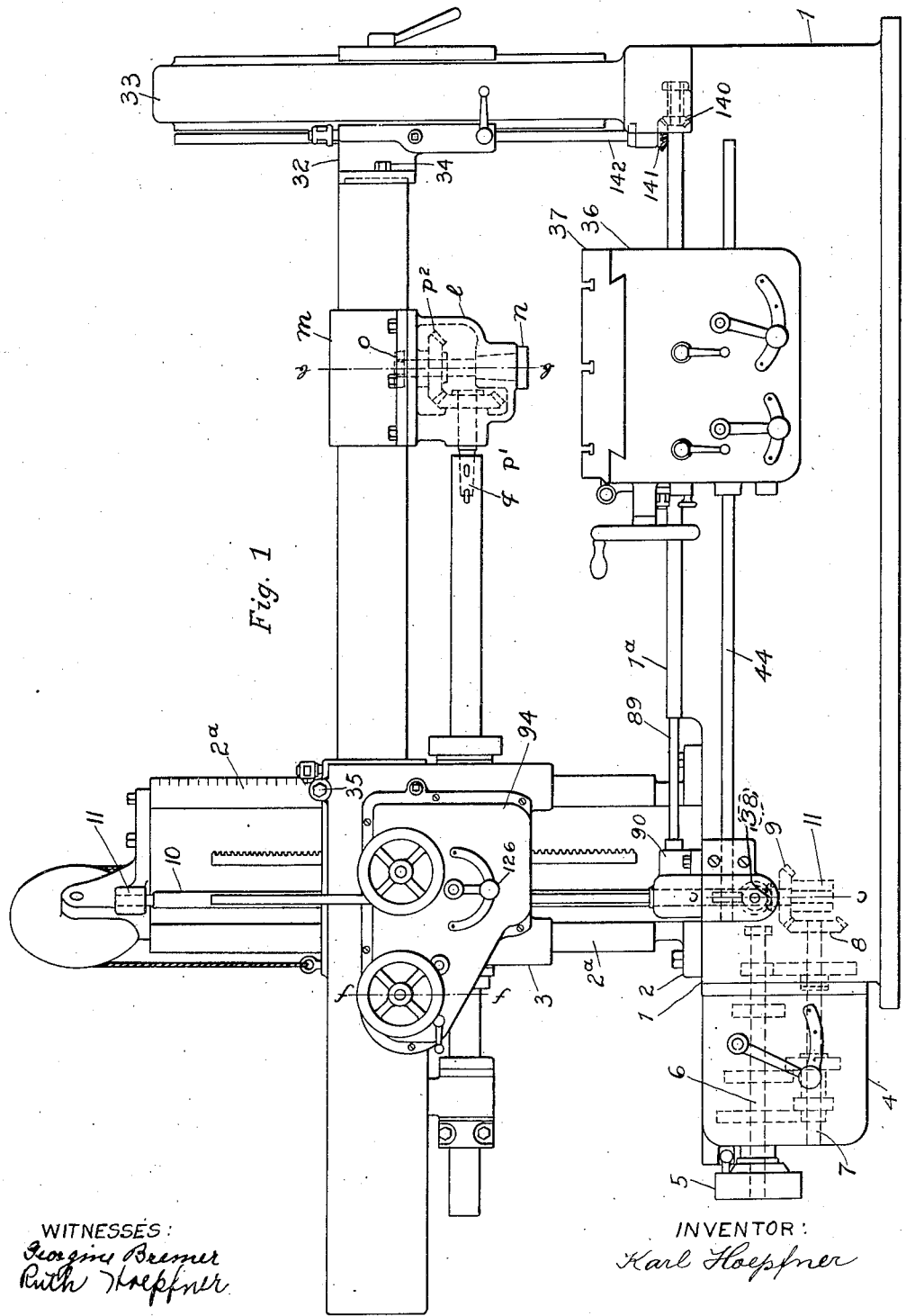

Oct. 6, 1925.  K. HOEPFNER  1,556,146
MACHINE TOOL
Filed July 29, 1921   6 Sheets-Sheet 2
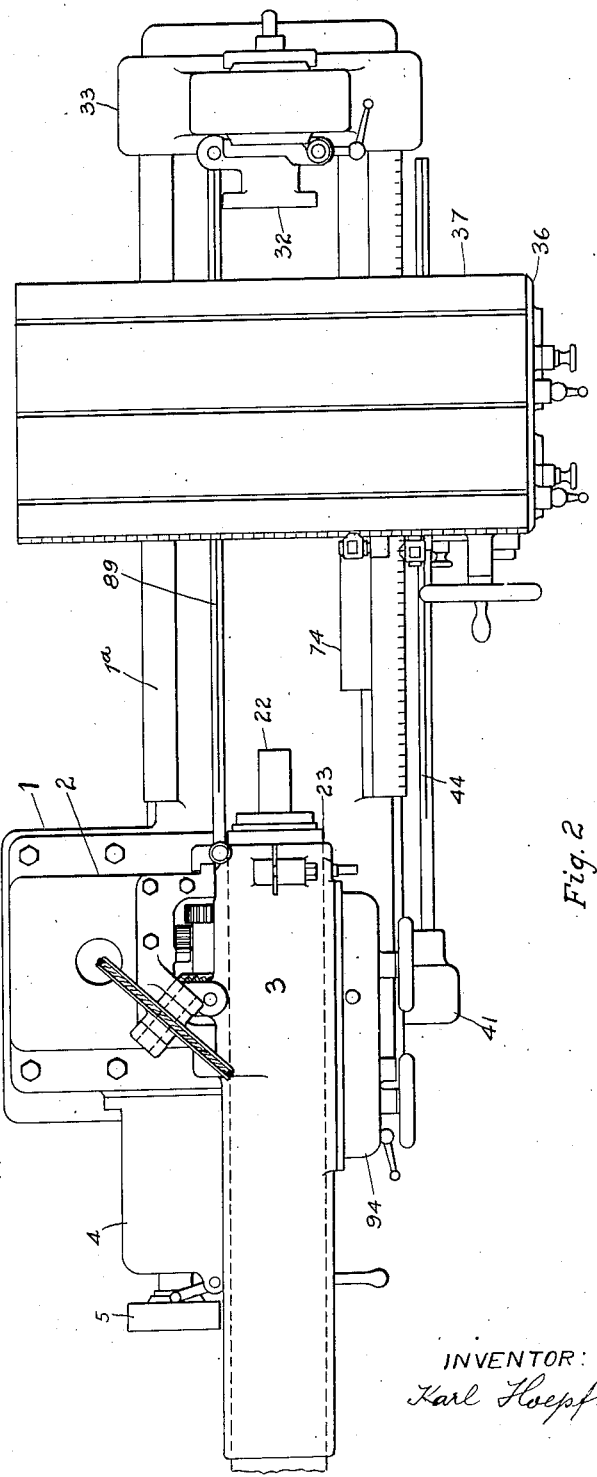
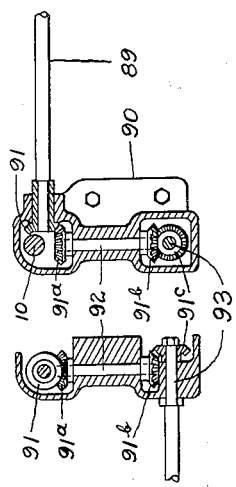
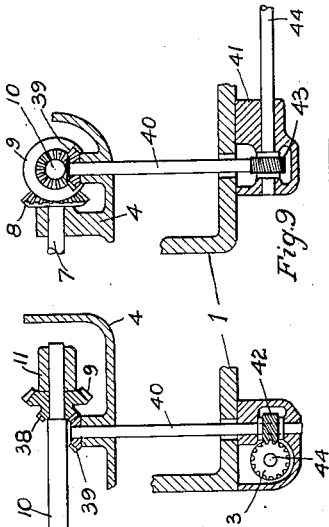
WITNESSES:
Georgine Beemer
Ruth Hoepfner
INVENTOR:
Karl Hoepfner Oct. 6, 1925. 1,556,146
K. HOEPFNER
MACHINE TOOL
Filed July 29, 1921    6 Sheets-Sheet 3

WITNESSES:
Georgine Bremer
Ruth Hoepfner

INVENTOR.
Karl Hoepfner

Oct. 6, 1925.
K. HOEPFNER
1,556,146
MACHINE TOOL
Filed July 29, 1921 6 Sheets-Sheet 4
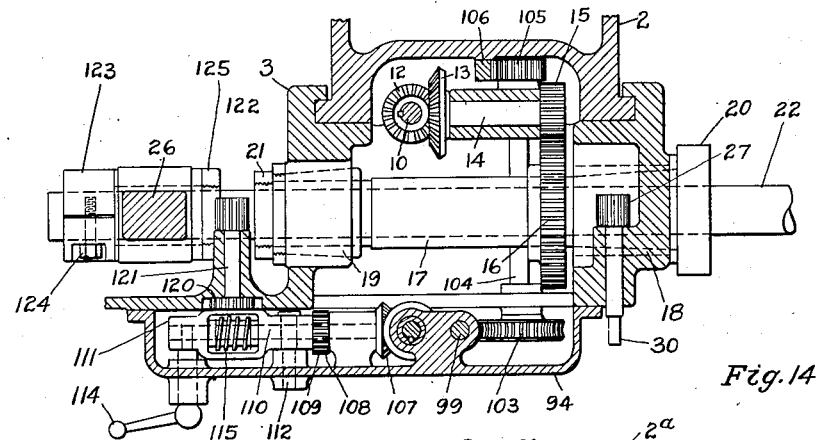
Fig. 14
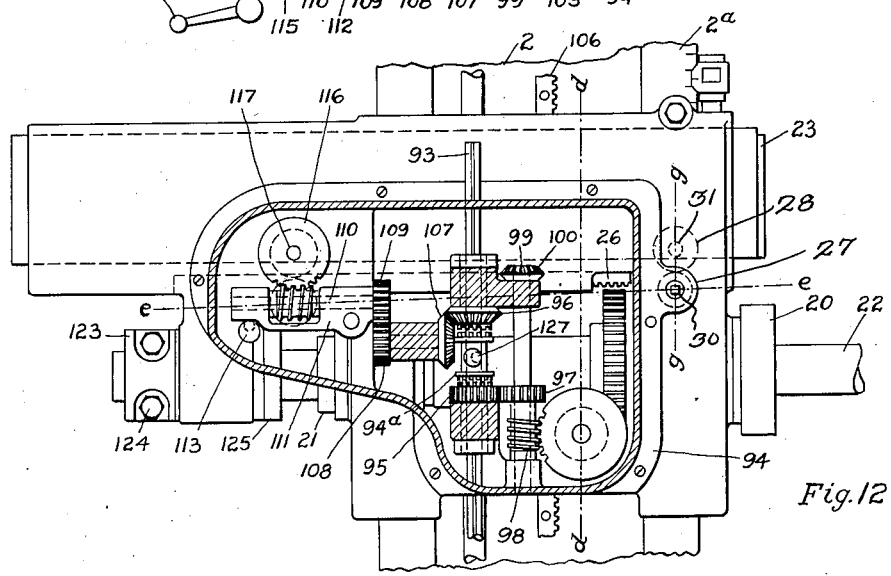
Fig. 12
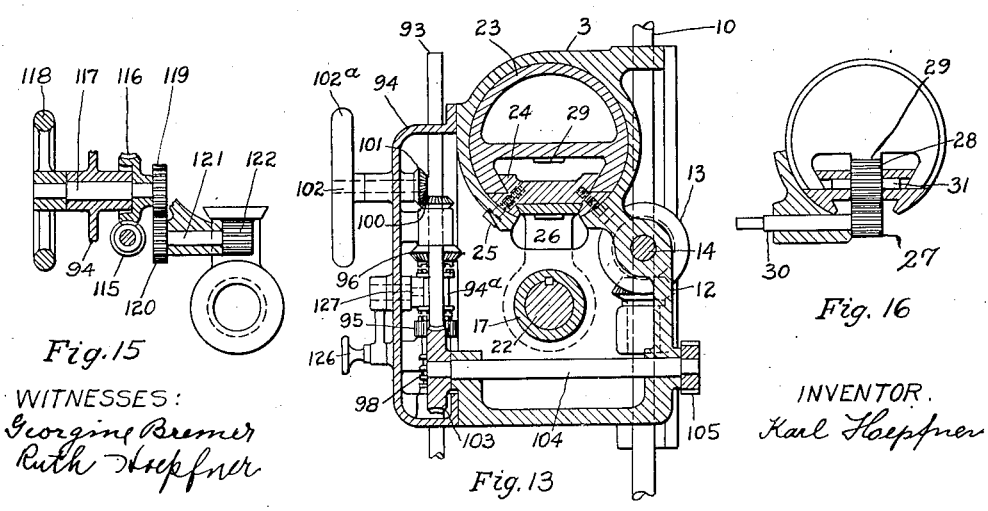
Fig. 15
Fig. 13
Fig. 16
WITNESSES:
Georgine Bremer
Ruth Hoepfner
INVENTOR.
Karl Hoepfner Oct. 6, 1925.

K. HOEPFNER

MACHINE TOOL

Filed July 29, 1921    6 Sheets-Sheet 5

1,556,146

WITNESSES:
Georgine Bremer
Ruth Hoepfner

INVENTOR.
Karl Hoepfner

Oct. 6, 1925.
K. HOEPFNER
1,556,146
MACHINE TOOL
Filed July 29, 1921   6 Sheets-Sheet 6
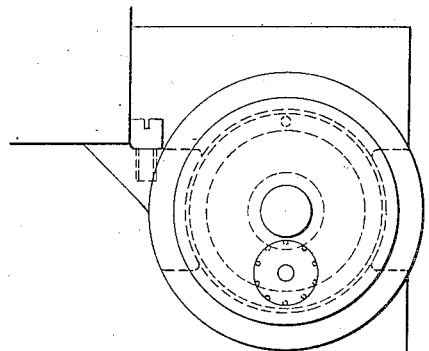
Fig. 23
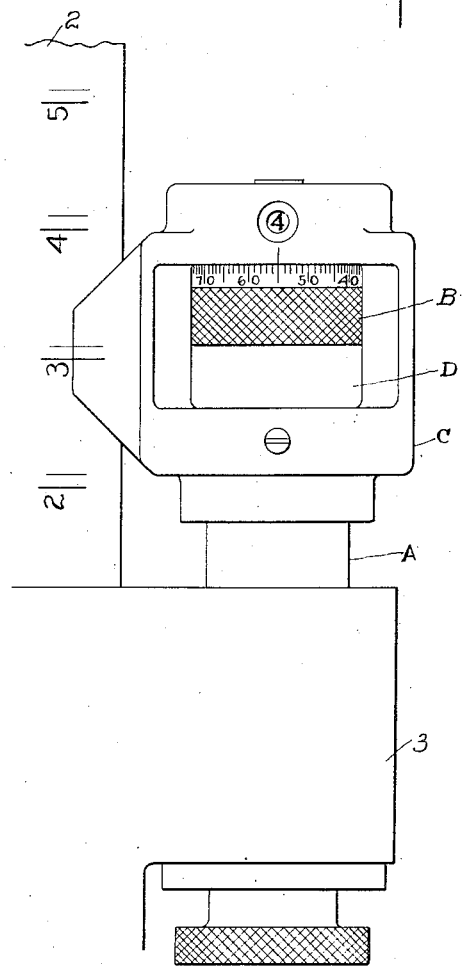
Fig. 22
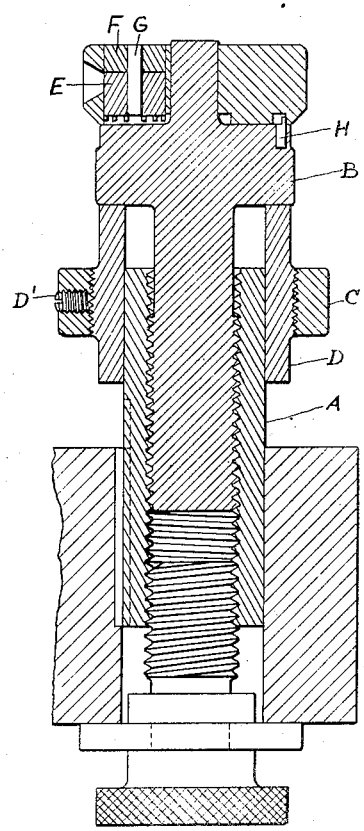
Fig. 25
Fig. 24
INVENTOR.
Karl Hoepfner Patented Oct. 6, 1925.

1,556,146

UNITED STATES PATENT OFFICE.

KARL HOEPFNER, OF DETROIT, MICHIGAN.

MACHINE TOOL.

Application filed July 29, 1921. Serial No. 488,331.

*To all whom it may concern:*

Be it known that I, KARL HOEPFNER, a citizen of Germany, residing at Detroit, county of Wayne, and State of Michigan, have invented certain new and useful Improvements in Machine Tools, of which the following is a specification.

My invention relates to improvements in machine tools, and more particularly to machines of the horizontal boring mill type, especially adapted for combined boring, milling, drilling and tapping operations.

The object of my invention is to provide means for precise adjustment of the work-carrying members relatively to the tool-carrying members, and to place the feed adjusting and control mechanism within easy reach of the operator. A further object of the invention is to provide a supporting beam for a vertical attachment.

In machines of this type, it has been demonstrated, that it is impossible to keep spindle head and outer bearing in perfect alignment after elevating or depressing both thru feed screws connected by gearing. It further has been demonstrated that the power feed and control mechanism are used only for roughly adjusting the carriage longitudinally of the bed or the platen transversely on the carriage. The precise and final adjustment of either the work carrying members or the tool carrying members is always accomplished by manually operating a crank or handwheel. Heretofore, the means for adjustment of these members consisted of feed screws with attached dials graduated to the thousandth part of an inch. According to the location of the feed screws it is often necessary to add supplementary shafts and gearing to make them accessible to the operator. Since all gearing and bearings are subject to wear, it is obvious that the inaccuracies caused thru lost motion are detrimental to the precise adjustment and therefore undesirable. In my improved machine I do not depend on feed screws, but provide novel means for reading direct the relative position of the carriage on the bed, the platen on the carriage, the spindle head and the outer bearing on their respective columns. Other objects will appear hereafter.

Figure 4:
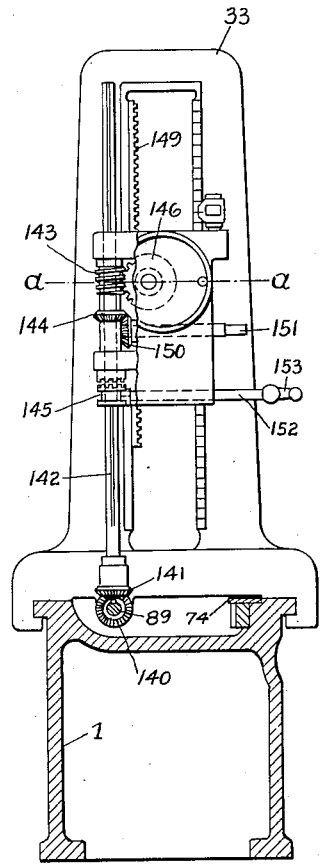
Figure 7:
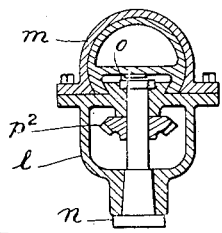
Figure 5:
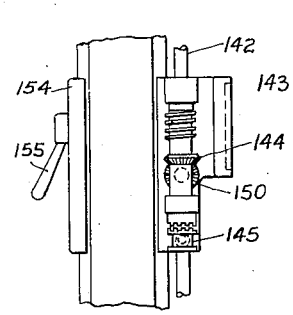
Figure 6:
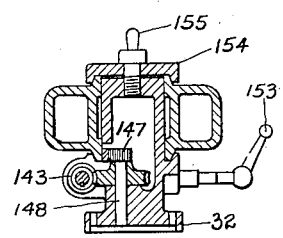
Figure 17:
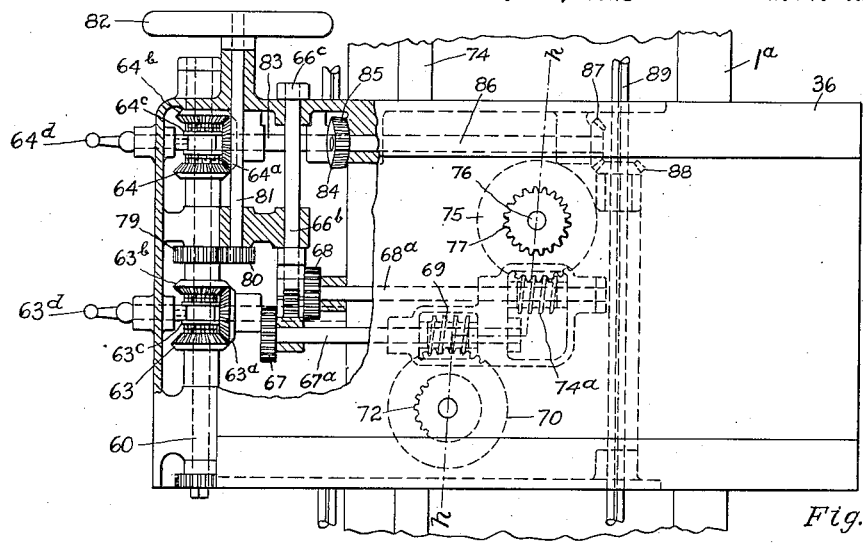
Figure 21:
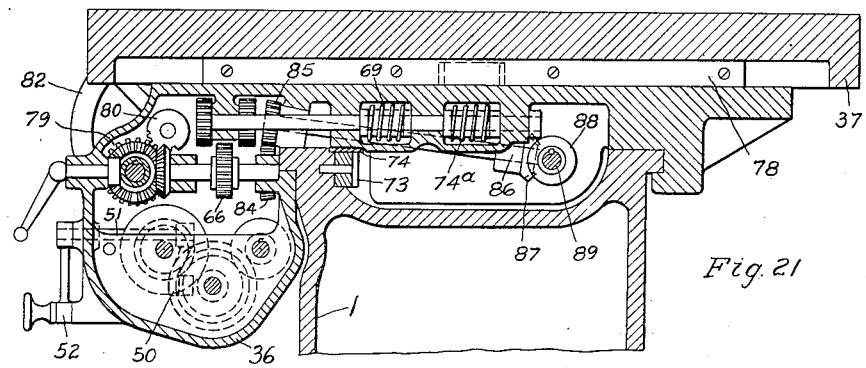
Figure 19:
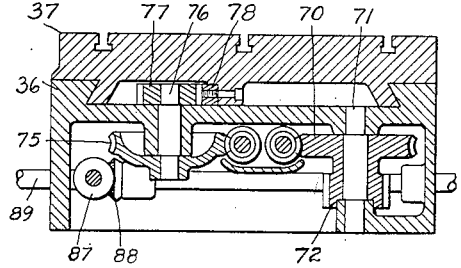
Figure 18:
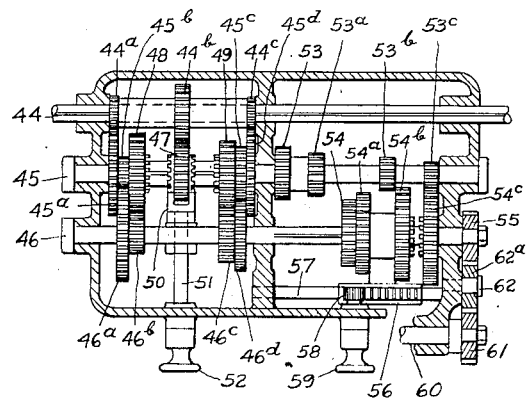
Figure 20:
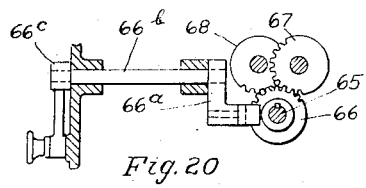

I attain these objects by the mechanism illustrated in the accompanying drawings, in which—Fig. 1 is a front elevation of the machine with vertical attachment; Fig. 2 is a top plan view of the machine with over arm retracted; Fig. 3 is an elevation of the head end of the machine; Fig. 4 is a section thru the bed with elevation of the outer bearing column; Fig. 5 is a rear view of the outer bearing; Fig. 6 is a section on the line $a$—$a$ of the outer bearing Fig. 4; Fig. 7 is a section on the line $b$—$b$ Fig. 1; Fig. 8 is a vertical section on the line $c$—$c$ Fig. 1, showing the geared connection from the vertical drive shaft to the horizontal feed shaft; Fig. 9 is a horizontal section thru the bed showing the same arrangement; Fig. 10 is a vertical section immediately above the section $c$—$c$ of Fig. 1, showing the bracket carrying the feed shaft connection; Fig. 11 is a horizontal section thru the same bracket ; Fig. 12 is a front view of the spindle head with part of the cover broken away; Fig. 13 is a section of the spindle head on the line $d$—$d$ Fig. 12; Fig. 14 is a section of the spindle head on the line $e$—$e$ Fig. 12; Fig. 15 is a partial section of the spindle head on the line $f$—$f$ Fig. 1, showing the geared connection to the boring bar slide; Fig. 16 is a partial section on the line $g$—$g$ Fig. 12 of the spindle head, showing the gearing for longitudinally shifting the overarm; Fig. 17 is a plan view of the carriage partly broken away, showing the reverse gear mechanism actuating the carriage, the platen, the boring bar, the spindle head and outer bearing; Fig. 18 is a sectional view of the feed gearing in the carriage; Fig. 19 is a section of the platen and the carriage on the line $h$—$h$ of Fig. 17, showing the worm drive to the platen and carriage; Fig. 20 is a sectional view of the gear shifting mechanism for engaging the feed worm; Fig. 21 is a sectional view of the platen and carriage illustrating the geared feed mechanism; Fig. 22 is a plan view of the micrometer; Fig. 23 is an end view thereof; Fig. 24 is a longitudinal section; Fig. 25 is a detail.

Referring to the drawings, 1 represents the frame or bed of the machine, provided with guide ways $1^a$. At one end of the bed, called the head end is mounted a column 2, having vertical guide ways $2^a$, on which is guided the spindle head 3. Fixed to the bed, at the head end of the machine is the gear box 4, which carries a clutch pulley 5, mounted on a shaft 6, journaled in said gear box. Thru a series of change gears located in the gear box, the shaft 7 may be driven at different speeds by manipulation of the change lever in front of the gear box. The arrangement of the gear box may be of any suitable, well known type and therefore needs no further description. A pair of miter gears 8 and 9 transmit rotary movement from the gear box to the vertical shaft 10, journaled in bearings 11. Splined to the vertical shaft and rotatably mounted in the spindle head is a bevel gear 12, Figs. 13 and 14; engaging a bevel gear 13; a short shaft 14 horizontally journaled in the spindle head has fixed to its end the bevel gear 13 and a spur pinion 15. In mesh with said pinion is the spindle drive gear 16, secured to the hollow spindle 17. The spindle is journaled in adjustable bearings 18 and 19 of the spindle head and prevented from longitudinal movement thru the flange 20 and the collar 21, the latter being threaded to the spindle end. Splined in the spindle and longitudinally movable therein, is the boring bar 22. Above the spindle and parallel thereto is carried in the spindle head a supporting beam or over arm 23. The purpose of this overarm is primarily to carry and guide a vertical attachment hereafter more fully described, and secondary to support the boring bar by suitable bearings not shown. A suitable bore in the spindle head receives the circular over arm and its guide plate 24; the guide plate extending the whole length of the spindle head is secured thereto by screws 25, and being fitted to corresponding surfaces of the over arm prevents the latter from rotary movement. The guide plate serves a double purpose, it also guides the boring bar slide 26, which is dovetailed therein; the operative connection of the boring bar will be described hereafter.

Means for longitudinally moving the over arm, consist of a pinion 27, Fig. 16, and intermediate gear 28 and rack teeth 29 on the over arm. The pinion 27 is secured to a shaft 30 journaled in a suitable bearing of the spindle head, and provided at its outer extremity with a square portion for the application of a wrench. The gear 28 is fixed to a pin 31 journaled in the guide plate. To support the over arm with the vertical attachment guided thereon, an outer bearing 32 with a recessed flange is provided to center the over arm and to facilitate its axial alignment, after which clamping screws 34 of the outer bearing and screw 35 of the spindle head are tightened. A column 33 guided on the ways of the bed carries the vertically movable outer bearing; detailed description of said column will be found hereafter.

Slidably mounted on the ways of the bed is the carriage 36, provided with guide ways for the table or platen 37. The front part of the carriage is formed into a gear box and has located therein the feed change gearing.

Power to said feed gearing is transmitted in the following manner: The miter gear 9, Figs. 8 and 9, is provided with gear teeth 38 to engage the miter gear 39, secured to the shaft 40, which is journaled in the gear box 4 and a gear bracket 41, the latter being secured to the front of the bed. Two helical gears 42 and 43 are mounted in said gear bracket, the former being fixed to the shaft 40, the latter to the shaft 44, extending almost the entire length of the bed. From this arrangement it is apparent that the feed shaft 44 is rotating relatively to the vertical shaft 10, and consequently of the spindle 17. Referring to Fig. 18, the shaft 44 is journaled in suitable bearings of the carriage 36; splined to said shaft and located between two bearings is a sleeve provided with gears 44$^a$, 44$^b$, and 44$^c$. In cooperative connection with said gears are the two shafts 45 and 46, containing a multiplicity of tight and loose gears, thru the cooperative action of which, different feeds may be imparted to all the work- and tool carrying members of the machine. Loosely mounted on the shaft 45, but fixed in pairs, are the gears 45$^a$ and 45$^b$, 45$^c$ and 45$^d$, respectively; engaging said pairs of gears and loosely mounted on the shaft 46, are the gears 46$^a$ and 46$^b$, 46$^c$ and 46$^d$, respectively. Splined to the shaft 45 is a gear 47, provided with clutch teeth on either side, and adapted to be engaged with the gear 44$^b$, or to be locked to the gears 48 and 49, which for this purpose are also provided with clutch teeth. The gears 48 and 49, rotating loosely on shaft 45, and being in mesh with the gears 46$^b$ and 46$^c$ respectively, impart rotation to these gears, according to the position of gear 47. The means for shifting the gear 47, comprises a fork 50, secured to the shaft 51 and a crank handle 52, the crank handle being secured to the shaft on the exterior of the carriage. A series of gears 53, 53$^a$, 53$^b$ and 53$^c$ secured to the shaft 45 may be alternately engaged with a cone of gears 54, 54$^a$ and 54$^b$, a gear 54$^c$, loosely mounted on the shaft 46 and engaging the gear 53$^c$, may be locked to said cone of gears by clutch teeth formed on the gear 54$^c$ and the adjacent side of the cone. A gear 55 secured to the end of shaft 46 transmits the variable speeds thus obtained to the reversing mechanism also mounted in the carriage. The said cone of gears is splined to the shaft 46 and can be shifted thereon by a member 56, guided between the largest gears of the cone and sliding on a fixed rod 57. By means of rack teeth on member 56, in mesh with a pinion 58, the former may be actuated from the exterior of the carriage thru the crank arm 59, to which the pinion 58 is secured. Above said feed change mechanism and parallel to said shafts is journaled the shaft 60, with a gear 61, secured to its outer extension; a stud 62 fixed to the carriage has loosely mounted on it, an intermediate gear 62ᵃ, to form the connection with gears 55 and 61.

The shaft 60 has rotatably mounted on it the miter gears 63 and 63ᵇ, engaging the gear 63ᵃ, a clutch 63ᶜ splined to the shaft 60, and adapted to be locked with the gear 63 or the gear 63ᵇ, will rotate the gear 63ᵃ in one direction or the other. In a similar manner the miter gears 64, 64ᵇ and the clutch 64ᶜ cause the gear 64ᵃ to rotate in one direction or the other. To shift the clutches 63ᶜ and 64ᶜ to their several positions annular grooves are provided to engage a block mounted on eccentric pins formed on the crank handles 63ᵈ and 64ᵈ, respectively. The shaft 65 journaled at a right angle to the shaft 60 and having secured thereto the gear 63ᵃ, has slidably mounted on it the gear 66, which is shifted by a fork 66ᵃ fixed to the shaft 66ᵇ, with a crank arm 66ᶜ on the exterior of the carriage, Fig. 20. Above and on either side of the gear 66, are located the gears 67 and 68, which may be alternately engaged with the gear 66, by manipulation of said crank arm 66ᶜ. The gear 67 is secured to a shaft 67ᵃ extending inwardly over the ways of the bed, carrying a worm 69 in mesh with a wormwheel 70, rotatably mounted on a vertical stud 71; a spur gear 72 formed on the hub of said wormwheel, engaging a rack 73. Suitable radial and thrust bearings for the worm are provided in the carriage to which is also rigidly secured said stud 71; since said rack is fastened to the bed, it is apparent that the rotary movement transmitted to the worm must cause sliding movement of the carriage. A cover plate 74 secured to the bed prevents chips and dirt from lodging between the teeth of said rack. Similar to the manner described, the platen receives its sliding movement from the gear 68, thru the shaft 68ᵃ, the worm 75, in mesh with the wormwheel 76, secured to a shaft 76ᵃ, rotatably mounted in the carriage on gear 77, located between the ways of the carriage and engaging a rack 78, fastened to the platen; said gear 77 being secured to the upper end of said shaft 76ᵃ. To operate manually either the carriage or the platen the miter gear 63ᵇ has secured to its hub a spur gear 79, engaging a pinion 80, fixed to a shaft 81 extending from the carriage and having fixed thereto a handwheel 82, rotation of which imparts movement to the carriage or the platen according to the position of the gear 66.

The forward or reverse motion imparted to the miter gear 64ᵃ is utilized in the following manner: A shaft 83 journaled in the carriage, has secured to it said gear 64ᵃ and a bevel gear 84, engages a similar bevel gear 85, fixed to an inclined shaft 86. A miter gear 87 secured to said shaft 86 is in mesh with a miter gear 88, journaled in the carriage and splined to a shaft 89, extending the entire length of the bed, being journaled in the carriage and at the head end of the bed in a gear bracket 90, Figs. 10, 11, 1 and 3. Said gear bracket is fastened to the top of the bed and carries the miter gears 91, 91ᵃ, 91ᵇ, and 91ᶜ; the gear 91 is secured to the shaft 89, gears 91ᵃ and 91ᵇ are fixed to the shaft 92, journaled in said gear bracket. The gear 91ᶜ is fixed to a vertical shaft 93, having its lower bearing in said gear bracket and upper bearings in a gear case 94, Figs. 12, 13 and 14.

Referring now to the feed mechanism of the spindle head, it will be seen that the gear case 94 has mounted in it the various parts comprising this mechanism. The feed shaft 93 is provided with a keyway its whole length to which is splined a clutch member 94ᵃ, adapted to be engaged with a spur gear 95 or a miter gear 96, both gears having clutch teeth conforming with the clutch 94ᵃ. Rotatably mounted in the gear case, the gear 95 engages a gear 97, integral with a worm 98 secured to a shaft 99, parallelly journaled with the shaft 93. The upper end of shaft 99 has fixed thereto a miter gear 100, which engages a miter gear 101, fixed to a shaft 102 journaled in the gear case. A handwheel 102ᵃ secured to the shaft 102, serves to manually operate the shaft 99 and consequently worm 98, the latter being in mesh with a worm wheel 103, secured to a shaft 104, rotatably mounted in the spindle head. Said shaft 104 extending from the spindle head between the ways of the column 2 has fixed to this end a spur gear 105 in mesh with a rack 106, secured to the column. The gear 96 rotatably mounted in the gear case, engages the miter gear 107, rigidly connected to a spur gear 108, journaled in said gear case. Above, and in mesh with the gear 108 is a spur gear 109, secured to a shaft 110 journaled in a bearing 111. A stud 112 secured to the gear case, serves as a pivot for the bearing 111, which may be locked by means of an eccentric pin 113, journaled in the gear case. Rotating the pin 113 by means of the handle 114, obviously raises or lowers said bearing 111 and engages or disengages the worm 115 with the worm wheel 116; the worm being fixed to the shaft 110 in bearing 111, the worm wheel to a shaft 117. Said shaft being journaled in the gear case, has secured to its outward extension a spur gear 119. 120 designates a similar spur gear secured to a shaft 121, provided with gear teeth 122 in mesh with the rack teeth of the boring bar slide 26. Said boring bar slide at its outward extension carries a sleeve 123, adapted to be clamped to the boring bar by means of the screws 124. The sleeve has two different diameters, the smaller of which is journaled in the boring bar slide, while the larger diameter forms a shoulder and with additional washers and a threaded collar 125 prevents endwise movement of said sleeve.

A crank handle 126, Figs. 1 and 13 on the exterior of the gear case 94 has inwardly extending an eccentric pin 127, which carries a shifter engaging an annular groove of the clutch 94ᵃ. From the foregoing description it follows that the different positions of the crank handle indicate whether the spindle head or the boring bar is to be actuated.

To facilitate the application of a constant power in raising or lowering the spindle head, a counterweight 128, Fig. 3, is provided. Attached to the spindle head and to the counterweight is a flexible cable 129 passing over a sheave 130 rotatably mounted on a pin 131, supported by a bracket 132.

To make the machine more universally adaptable and to meet the varying demands and exigencies of the work, this machine is equipped with a vertical attachment. The said attachment receives its driving power from the boring bar, see Figs. 1 and 7, and consists of the gear case $l$, the housing $m$, the vertical spindle $n$, the lock nut $o$, the miter gears $p^1$ and $p^2$ and the drive arbor $q$. The drive arbor journaled in the gear case has a conical extension to fit in a corresponding bore of the boring bar. The miter gears $p^1$ and $p^2$ secured to the drive arbor and the vertical spindle, respectively, transmit rotary movement to the vertical spindle, which is journaled in the gear case $m$, and suspended by the lock nut $o$. The gear case and housing are connected by screws, which also form the means for clamping the attachment to the over arm.

From the foregoing construction it is obvious that the over arm should at all times be perfectly parallel to the platen, for otherwise the accuracy of the work will be seriously impaired.

As a means for transmitting motion to the spindle head and simultaneously to the outer bearing, the column 33 has at its base rotatably mounted therein a miter gear 140, in mesh with the miter gear 141; the gear 140 being splined to shaft 89, while the gear 141 is secured to a vertical shaft 142. Said shaft 142 is journaled in the column and also in suitable bearings of the outer bearing 32. A sleeve mounted on the shaft 142 has secured thereto a worm 143 and a miter gear 144, the lower portion of the sleeve, being provided with clutch teeth, may be readily engaged with a clutch 145, splined to the shaft 142. In mesh with said worm is a worm wheel 146, secured to a pinion 147, formed on the inward extension of the shaft 148, journaled in the outer bearing. The pinion 147 engaging a rack 149, rigidly connected to the column, thru its rotation causes the outer bearing to slide up or down in the column. Manual adjustment of the outer bearing is accomplished by a miter gear 150, secured to a shaft 151, journaled in the outer bearing and provided with an angular shaped extension for the application of a crank handle. A rod 152 journaled in the outer bearing is provided with an eccentric portion to engage an annular groove of the clutch 145, said rod and clutch being actuated by the handle 153. After proper adjustment, the outer bearing is clamped to the column by means of a clamp plate 154 and a clamp screw 155, the screw being threaded in the outer bearing.

The micrometer adjustment of the several members will be readily understood by referring to the Figs. 22, 23, 24 and 25. Into the nut A, is threaded the screw B, which is surrounded by a casing C. The head of the screw forms a shoulder for abutment of the casing, which for this purpose is provided with a threaded sleeve D, for precise adjustment thereto, secured by a lock screw D'. The nut A, may be rigidly connected to any sliding tool or work carrying member, in this illustration it is secured to the spindle head 3; the column 2 represents a bed or stationary member. The stationary member is graduated to submultiples of the standard yard or meter, in this case to whole inches. The graduation consists of a light line in proximity to a heavy line, the heavy line is for quick reading, the light line for precise adjustment. Corresponding lines are impressed on an extension or wing of the casing C. Said wing of the casing slides over the stationary member and prevents the casing from rotating in unison with the screw, when the latter is rotated. The periphery of the screw head is knurled to enable the operator to turn the screw; the casing at its center portion has two diametrically opposite openings thru which graduation on the periphery of the screw head may also be read. Parallel to and above the axis of the screw is a circular cavity or bore in the casing, communicating with one side of the screw, to receive a disk E, which has the numbers 0, 1, 2, 3, 4, 5, 6, 7, 8, 9, stamped on its periphery and one side is provided projections or teeth. The bore in the casing is closed with a plate F, which carries a pin G, about which the disk E revolves. The screw head on the side adjacent to the disk E, carries a pin H, which engages one tooth of the eccentrically journaled disk for each revolution of the screw, the number of revolutions being registered thru a perforation in the casing, just large enough to expose but one of the numbers of the disk.

The operation of the micrometer is as follows: When the screw B is turned until the head is in contact with the nut A, then the zero line of its graduation coincides with a line on the casing and the disk E will register 0 thru the perforation in the casing. The screw has a pitch or thread of 1/10 inch and its head being graduated, so that each space is equal to 1/100 of a revolution; advances the casing for each graduation the 1/1000 part of an inch. To obviate the labor of counting the revolutions of the screw, the disk is registering each turn and all readings can be quickly made. Assuming now that the double line on the wing coincides with any graduation on the column, and it being desired to lower the spindle head 753/1000, then the screw is turned until the number 7 appears thru the perforation in the casing and the line on the casing coincides with the fifty-third graduation on the screw head. In this manner the casing was raised the desired amount and the spindle head must be lowered until the double line on the wing coincides again with the graduation on the column.

Having thus described my invention, I claim as new and desire to secure by Letters Patent—

1. In a machine tool, the combination with a bed, a carriage moveable thereon, a platen transversely moveable on said carriage, feed change gear mechanism carried by said carriage for actuating said carriage and platen, a column, a spindle head vertically moveable thereon, a spindle journaled in said spindle head, an over arm moveable in said spindle head, means for projecting or retracting said over arm, a boring bar longitudinally moveable in said spindle feed mechanism carried in the spindle head for actuating the spindle head or the boring bar, operative connection with the feed change gear mechanism of the carriage and the feed mechanism of the spindle head, micrometer adjustment to the spindle head, the carriage and the platen, substantially as described.

2. In a machine of the character described, a bed provided with ways, a carriage guided thereon, a platen guided on said carriage, a feed shaft journaled in the carriage, change gearing and reverse gear mechanism in the carriage, a shiftable gear adapted to alternately actuate the carriage and the platen, a shiftable clutch adapted to reverse the movement of said carriage and platen, micrometer adjustment to said carriage and platen, substantially as described.

3. In a machine tool, the combination with a bed, a guide column at each end of said bed, a spindle head and outer bearing mounted thereon, respectively, a carriage mounted on the bed, a platen guided in said carriage, a spindle rotatably mounted in said spindle head, a boring bar splined in said spindle, an over arm carried by said spindle head, a vertical attachment, comprising a housing and a vertical spindle, gearing operatively connecting said boring bar and vertical spindle, feed change gearing in the carriage, operatively connected with and actuating said boring bar, said spindle head and outer bearing, said carriage and platen, manually operable means for actuating said feed change gear actuated members, micrometer linear adjustment of the spindle head and outer bearing, of the carriage and platen, substantially as described.

4. In a machine tool, the combination with a bed, a carriage mounted thereon, a platen guided in said carriage, a column, a spindle head adjustable thereon, a spindle rotatably mounted in said spindle head, a boring bar splined in said spindle, an over arm, means for projecting and retracting said boring bar and over arm independent of each other, feed change gearing and reverse gearing, cooperating therewith in said carriage, a feed rack secured to the column, to the bed and to the platen, respectively, operative connection with the gearing in said carriage, whereby the spindle head is elevated or depressed, the carriage moved longitudinally, and the platen transversely of the bed, means for manually actuating and precisely adjusting said spindle head, carriage and platen substantially as described.

In testimony whereof, I have signed my name to the specification.

KARL HOEPFNER.